United States Patent [19]

Bogart

[11] 4,195,764
[45] Apr. 1, 1980

[54] BRAZING OF POWDERED METAL PARTS

[75] Inventor: Eldred Bogart, Pekin, Ill.

[73] Assignee: Caterpillar Tractor Co., Peoria, Ill.

[21] Appl. No.: 847,961

[22] Filed: Nov. 2, 1977

[51] Int. Cl.² ............................................. B23K 1/04
[52] U.S. Cl. ................................ 228/208; 29/420.5; 228/215; 75/208 R
[58] Field of Search ............................. 228/208–210, 228/215; 75/208 R; 76/101 R, DIG. 11; 29/420, 420.5

[56] References Cited

U.S. PATENT DOCUMENTS

| | | | |
|---|---|---|---|
| 3,222,774 | 12/1965 | Kump et al. | 228/195 X |
| 3,380,151 | 4/1968 | Parsons | 228/209 |
| 3,409,974 | 11/1968 | Lueck et al. | 75/208 R |
| 3,744,993 | 7/1973 | Matt et al. | 75/213 |
| 3,851,985 | 12/1974 | Coleman | 29/420.5 X |
| 4,029,476 | 6/1977 | Knopp | 75/208 R |

FOREIGN PATENT DOCUMENTS 380100 8/1932 United Kingdom ................. 228/209

Primary Examiner—Francis S. Husar
Assistant Examiner—K. J. Ramsey
Attorney, Agent, or Firm—Wegner, Stellman, McCord, Wiles & Wood

[57] ABSTRACT

Disclosed is a method of joining, by brazing, two metal pieces at least one of which is a powdered metal piece, each piece having a joint surface. The method includes the step of plating the joint surface of the powdered metal piece with a thin layer of metal having a relatively high melting point, assembling the pieces with their joint surfaces in substantial abutment, and applying a metal brazing composition having a flow temperature at least about 300°–400° F. or more less than melting point of the plating metal to the joint surfaces while heating the joint with a torch. The method eliminates the need for rigorous temperature control customarily employed in powdered metal brazing.

3 Claims, 2 Drawing Figures

BRAZING OF POWDERED METAL PARTS

BACKGROUND OF THE INVENTION

This invention relates to brazing methods and, more specifically to the brazing of two or more metal pieces, at least one of which is a powdered metal piece.

The use of powdered metal in forming parts of various sizes and shapes has become increasingly popular in that in many applications, after the powdered metal part is formed in the usual manner, little or no machining is required to place the part in condition for use. This is in considerable contrast to the fabrication of parts by the casting of molten metal. Such molten metal cast parts must be considerably processed after the casting to remove sprues, deburr edges, and machine surfaces so that they will properly mate with other parts to which they may be assembled.

Many parts assembly operations utilize brazing as a means securing components together, but heretofore, the joining of two metal parts, at least one of which is a powdered metal part, by brazing, has not been successfully accomplished except by extremely rigorously controlled methods. When it is attempted to braze a powdered metal part in the age old brazing method, capillary action, due to the porous nature of the powdered metal part, has resulted in excessive braze metal penetration into the powdered metal part with the consequence that there is insufficient braze metal at the joint itself and the joint may be weak or, in applications requiring fluid tightness, leaky.

In order to solve this difficulty, it has been proposed to depart from standard brazing compositions when brazing powdered metal parts to brazing alloys based on nickel, manganese and copper which frequently contain small amounts of silicon and boron. In brazing, using such a composition, as the braze metal flows and enters the joint, it alloys with the powdered metal part at the interface of the joint and the alloy thus formed has a flow temperature somewhat higher than that of the braze metal being utilized. Consequently, penetration of the braze metal into the powdered metal part is minimized or eliminated to provide an excellent joint.

However, when brazing according to this method, extreme care must be exercised so that the temperature of the joint is not elevated above the flow temperature of the alloy formed by the braze metal and the powdered metal part. If that flow temperature is exceeded, the alloy will flow into the powdered metal part destroying the barrier it previously formed at the interface of the two parts and thereby allowing the braze metal to excessively penetrate the powdered metal part. When such occurs, the joint formed is no better than that provided when brazing of powdered metal parts is attempted using conventional braze metals.

Therefore, in order to provide close temperature control to ensure the formation of good joints, it has heretofore been necessary to heat the components to be brazed and perform the brazing operation in a furnace whose temperature is closely controlled to elevate the temperature of the part to a temperature above the flow temperature of the brazing material and less than the flow temperature of the alloy formed by the braze material and the powdered metal part. This method, while performing its intended function, has a number of disadvantages in various applications. For example, since the parts must be contained within a furnace, where one or more of the parts has a large mass, it necessarily requires that the entire part be heated to a temperature in excess of the flow temperature of the braze metal which would not necessarily be the case if a more conventional brazing method could be utilized. Thus, there may be excessive energy consumption associated with the use of this method.

The method is also unsatisfactory where one or more of the parts to be joined by brazing has an unusual shape or size since the furnace must necessarily be constructed to house the parts. Consequently, and particularly where extremely long articles are to be formed, excessively large furnaces must be provided so that the parts may be contained therein. Such large furnaces are expensive to manufacture, frequently must be custom built for a given application, and, because of their size, have excessive energy requirements.

SUMMARY OF THE INVENTION

The present invention is directed to overcoming one or more of the above problems.

According to the present invention, there is provided a method of torch brazing powdered metal parts which eliminates the need for close temperature control, thereby eliminating the need for furnaces required in prior art methods. The present invention contemplates the steps of providing two metal pieces, at least one of which is formed of powdered metal, each having a joint surface. The joint surface of the powdered metal piece or pieces is plated with a thin layer of a metal having a relatively high melting point which serves as a barrier to the penetration of braze metal into the powdered metal part. The pieces are assembled with their joint surfaces in substantial abutment and a metal brazing composition having a flow temperature considerably less than the melting point of the plated metal layer is applied to the joint surfaces while the joint is heated with a torch. Because of the considerable difference in temperature between the flow temperature of the braze metal and the flow point of the metal plating, the joint temperature may widely fluctuate during the brazing process, as is customary with torch heating without exceeding the flow point of the metal plating layer so that the same serves as a barrier to excessive penetration of the braze metal.

Other objects and advantages will become apparent from the following specification taken in connection with the accompanying drawings.

DESCRIPTION OF THE PREFERRED EMBODIMENT

According to the present invention, there is provided a method whereby brazed joints may be successfully formed to unite parts, at least one of which is a powdered metal part, utilizing conventional metal braze compositions and utilizing torch heating of the joint in a conventional fashion and which eliminates the need for close temperature control during the brazing operation to eliminate the use of brazing furnaces and the disadvantages attendant their use.

Figure 1:
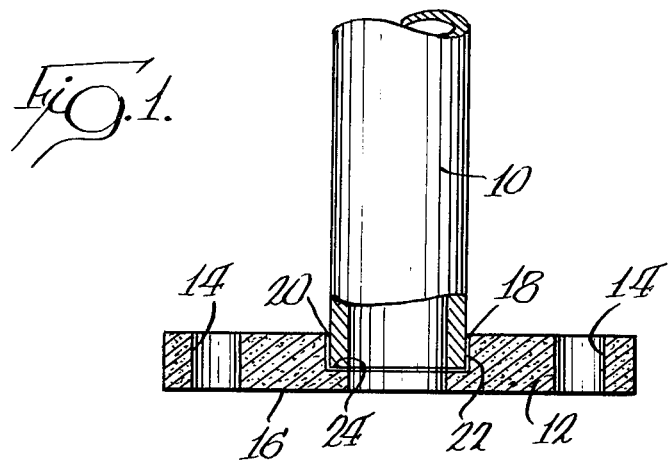
FIG. 1 illustrates an article formed with a brazed joint formed by the method of the present invention with parts shown in section.

The method is particularly suited for use in joining parts having a high mass without the need of uniformly heating each part and/or parts having unusual shapes or sizes which cannot be easily accommodated in a furnace. One such article is shown in FIG. 1 in the form of a pipe with a pipe flange. An elongated pipe 10, which may be of ferrous composition, is united to a pipe flange 12 previously formed in a conventional fashion of ferrous powdered metal. The flange 12 includes circumferentially spaced bolt holes 14 for receipt of bolts whereby the flange 12 may be abutted against a similar flange. The flange 12 is formed of powdered metal to eliminate or minimize the need for operations such as machining of the surface 16 which is to face another flange to remove irregularities therefrom.

The pipe 10 and flange 12 are joined at a lap joint 18 which may be of conventional construction and made according to good brazing techniques and the two are held in assembled relation by a layer of solidified braze metal 20 uniting the joint surface 22 on the pipe 10, that is, the end of the pipe 10, and the upper part of a stepped bore 24 in the pipe flange 12 which defines the joint surface of the flange 12.

Figure 2:
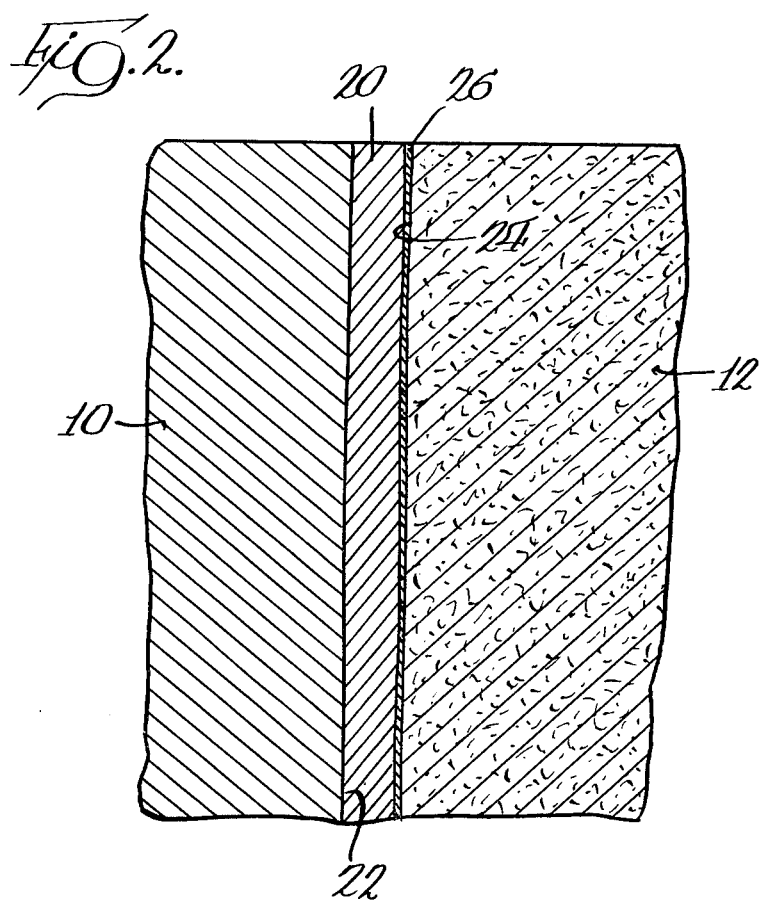
FIG. 2 is an enlarged sectional view illustrating part of the interface of the brazed joint.

According to the present method, prior to the assembly of the parts into abutting relation, a thin layer 26 (FIG. 2) of metal is plated onto the joint surface 24 of the powdered metal part 12. Conventional plating methods may be utilized, but it is desirable that the metals used in forming the layer 26 have a relatively high flow point or temperature. The layer may be relatively thin as, for example, 0.001 or 0.002 inches thick. A metal brazing composition will then be applied to one or the other of the surfaces 22 and 24 in solid form (including paste). In the usual case, the metal brazing material may be in the form of a wire.

The metal brazing composition will be one that has a flow temperature considerably less than the flow point of the metal forming the layer 26. The actual difference will be dependent upon the precise type of torch utilized and the mass of the components so that in applying heat to the joint, the temperature of the same cannot be elevated by the torch to a point above the flow point of the metal layer 26 and yet will be sufficiently high as to exceed the flow temperature of the brazing composition. In general, the temperature differential will be on the order of at least 300°–400° F. or greater.

The parts 10 and 12 are then brought together with their joint surfaces 22 and 24 in substantial abutment and heat applied to the joint in a conventional fashion. The flowing of the brazing composition is observed in the customary fashion and as soon as such has occurred, heating may be terminated by removing the torch from the joint.

The particular materials utilized can be easily selected by one skilled in the art following the above criteria. Of course, a further requirement is that the brazing material be such as to wet the surface of the material used in forming the metal layer 26 when the flow temperature of the brazing material has been exceeded.

Preferred materials useful in many applications are as follows. Nickel may be utilized as the metal of which the plated layer 26 is formed. Silver brazing alloys are generally preferred over bronze and copper brazing alloys for the reason that they generally have lower flow temperatures and tend to be more oxidation and corrosion resistant. It is highly preferred that the silver brazing alloy be one having a silver content in the range of about 25–75%.

When nickel plating and silver alloy braze metals are utilized, excellent joints will uniformly result. The flow temperatures of silver alloy braze materials within the preferred range typically extend downwardly from 1500° F. to slightly above 1300° F., depending upon silver content and the relative proportions of other materials conventionally employed in silver alloy braze metals. At the same time, the flow temperature of the nickel is in excess of about 2650° F. Consequently, even the most inattentive torch operator can be reasonably expected to observe the flowing of the brazing material well before the flow temperature of the nickel layer 26 is exceeded and terminate the heating step of the method.

From the foregoing, it will be appreciated that a brazing method according to the present invention eliminates the need for close temperature control heretofore requiring furnaces and therefore is ideally suited for use in joining articles of large mass or having unusual shapes or dimensions. It does not require extensive capital outlays, as are customarily required to install brazing furnaces, and can be easily practiced by the routineer in the brazing art. Moreover, it may be used with efficacy employing only age-old brazing compositions which are readily available.

The embodiments of the invention in which an exclusive property or privilege is claimed are defined as follows:

1. A method of brazing two metal pieces, at least one of which is a ferrous powdered metal piece, each having a joint surface, comprising the steps of:
   plating the joint surface of the ferrous powdered metal piece(s) with a thin layer of nickel;
   abutting the joint surfaces;
   applying a silver brazing alloy having a silver content in the range of about 25–70% silver to the surfaces and heating the surfaces with a torch until the brazing alloy flows; and
   thereafter discontinuing the heating of the surfaces before the nickel flows.

2. The method of claim 1 wherein the brazing alloy is applied in solid form to the surfaces prior to the initiation of the heating thereof.

3. The method of claim 1 wherein the ferrous powdered metal piece is a pipe flange and the other piece is an elongated metal pipe.

* * * * *